United States Patent
Masui et al.

(10) Patent No.: US 11,138,419 B2
(45) Date of Patent: Oct. 5, 2021

(54) DISTANCE IMAGE PROCESSING DEVICE, DISTANCE IMAGE PROCESSING SYSTEM, DISTANCE IMAGE PROCESSING METHOD, AND NON-TRANSITORY COMPUTER READABLE RECORDING MEDIUM

(71) Applicant: FUJITSU LIMITED, Kawasaki (JP)

(72) Inventors: Shoichi Masui, Sagamihara (JP); Hiroaki Fujimoto, Kawasaki (JP); Kazuhiro Yoshimura, Kawasaki (JP); Takuya Sato, Yokohama (JP); Kazuo Sasaki, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 83 days.

(21) Appl. No.: 16/601,643

(22) Filed: Oct. 15, 2019

(65) Prior Publication Data

US 2020/0042782 A1 Feb. 6, 2020

Related U.S. Application Data

(63) Continuation of application No. PCT/JP2017/018107, filed on May 12, 2017.

(51) Int. Cl.
*G06K 9/00* (2006.01)
*G06T 7/50* (2017.01)
*G06K 9/62* (2006.01)

(52) U.S. Cl.
CPC ....... *G06K 9/00369* (2013.01); *G06K 9/6256* (2013.01); *G06T 7/50* (2017.01); *G06T 2207/30196* (2013.01)

(58) Field of Classification Search
None
See application file for complete search history.

(56) References Cited

U.S. PATENT DOCUMENTS

2007/0268295 A1 11/2007 Okada
2011/0210915 A1* 9/2011 Shotton .............. G06K 9/00369
345/157

(Continued)

FOREIGN PATENT DOCUMENTS

JP 2004-226197 A 8/2004
JP 2007-310707 A 11/2007

(Continued)

OTHER PUBLICATIONS

Extended European Search Report issued for European Patent Application No. 17909348.9 dated Feb. 21, 2020, 11 pages.

(Continued)

*Primary Examiner* — Leon Flores
(74) *Attorney, Agent, or Firm* — Fujitsu Patent Center

(57) ABSTRACT

A learning device generates a plurality of learning images in which a distance image representing a distance from a reference position to each position of a human body or each position of an object and a part image for identifying each part of the human body or a part of the object are associated with each other. The learning device corrects, based on a distance image and a part image of the learning image, a value of a region corresponding to a part of the object among regions of the distance image. The learning device learns, based on a plurality of learning images including a corrected distance image, an identifier in which characteristics of the distance image and a part of the human body or a part of the object are associated with each other.

19 Claims, 19 Drawing Sheets

(56) References Cited

U.S. PATENT DOCUMENTS

| | | |
|---|---|---|
| 2011/0227923 A1 | 9/2011 | Mariani et al. |
| 2011/0228976 A1 | 9/2011 | Fitzgibbon et al. |
| 2011/0293180 A1 | 12/2011 | Criminisi et al. |
| 2014/0037197 A1 | 2/2014 | Thorne |
| 2015/0036879 A1 | 2/2015 | Tsukamoto et al. |
| 2016/0125243 A1 | 5/2016 | Arata et al. |
| 2016/0284017 A1 | 9/2016 | Almog et al. |
| 2018/0300590 A1 | 10/2018 | Briggs et al. |
| 2020/0074679 A1 | 3/2020 | Masui et al. |

FOREIGN PATENT DOCUMENTS

| | | |
|---|---|---|
| JP | 2012-120647 A | 6/2012 |
| JP | 2015-167008 A | 9/2015 |
| JP | 2016-091108 A | 5/2016 |
| JP | 2016-91108 A | 5/2016 |
| JP | 2016-212688 A | 12/2016 |
| WO | 2015/186436 A1 | 12/2015 |
| WO | 2015-186436 A1 | 12/2015 |

OTHER PUBLICATIONS

Rogez, Gregory et al.,"Understanding Everyday Hands in Action from RGB-D Images", 2015 IEEE International Conference on Computer Vision(ICCV), pp. 3889-3897, XP032866748.

Sharma, Vivek et al.,"Low-Cost Scene Modeling using a Density Function Improves Segmentation Performance", 2016 25th IEEE International Symposium on Robot and Human Interactive Communication RO-MAN, pp. 77-84, ) XP033006128.

Shotton, Jamie et al.,"Real-time human pose recognition in parts from single depth images", Communication of the ACM, vol. 56, No. 1, pp. 116-124, XP058010058.

Dinh, Dong-Luong et al.,"Hand number gesture recognition using recognized hand parts in depth images", Multimedia Tools and Applications, Kluwer Academic Publishers, vol. 75, No. 2, pp. 1333-1348, XP035924513.

ISR—International Search Report [Forms PCT/ISAI210, 220] and Written Opinion of the International Searching Authority [PCT/ISA/237] for PCT/JP2017/018034 dated Jul. 25, 2017, 10 pages.

International Search Report and Written Opinion of the International Searching Authority (Form PCT/ISA/210, 220, and 237), dated connection with PCT/JP2017/018107 and dated Jul. 25, 2017 (11 pages).

Extended European Search Report dated Feb. 18, 2020 for corresponding European Patent Application No. 17909349.7, 10 pages.

Shotton, Jamie et al., "Real-Time Human Pose Recognition in Parts from Single Depth Images", Communications of the ACM, Association for Computing Machinery, Inc., Jan. 2013, vol. 56 No. 1, pp. 116-124, XP058010058.

U.S. Office Action dated Sep. 14, 2020 for copending U.S. Appl. No. 16/676,404, 13 pages.

Japanese Office Action dated Oct. 6, 2020 for corresponding Japanese Patent Application No. 2019-516851, with English Translation, 4 pages.

U.S. Office Action dated Dec. 31, 2020 for copending U.S. Appl. No. 16/676,404, 14 pages.

U.S. Office Action dated Jun. 4, 2020 in copending U.S. Appl. No. 16/676,404, 21 pages.

Japanese Office Action dated Jul. 14, 2020 for corresponding Japanese Patent Application No. 2019-516851, with English Translation, 3 pages.

Japanese Office Action dated Jul. 28, 2020 for corresponding Japanese Patent Application No. 2019-516863, with English Translation, 3 pages.

EPOA—European Office Action dated Mar. 11, 2021 for European Patent Application No. 17909349.7.

USOA—Notice of Allowance dated Apr. 9, 2021 issued for related U.S. Appl. No. 16/676,404 [allowed].

USOA—Supplemental Notice of Allowability dated Apr. 30, 2021 issued for related U.S. Appl. No. 16/676,404 [allowed].

\* cited by examiner

FIG.5

| SYNTHETIC MODEL NUMBER | SYNTHETIC MODEL DATA |
|---|---|
| SYNTHETIC MODEL 1 | |
| SYNTHETIC MODEL 2 | |
| SYNTHETIC MODEL 3 | |
| ... | ... |

FIG.6

| LEARNING IMAGE NUMBER | PART-LABEL IMAGE DATA | DISTANCE IMAGE DATA | JOINT POSITION DATA |
|---|---|---|---|
| LEARNING IMAGE 1 | PART-LABEL IMAGE DATA OF LEARNING IMAGE 1 | DISTANCE IMAGE DATA OF LEARNING IMAGE 1 | JOINT POSITION DATA OF LEARNING IMAGE 1 |
| LEARNING IMAGE 2 | PART-LABEL IMAGE DATA OF LEARNING IMAGE 2 | DISTANCE IMAGE DATA OF LEARNING IMAGE 2 | JOINT POSITION DATA OF LEARNING IMAGE 2 |
| LEARNING IMAGE 3 | PART-LABEL IMAGE DATA OF LEARNING IMAGE 3 | DISTANCE IMAGE DATA OF LEARNING IMAGE 3 | JOINT POSITION DATA OF LEARNING IMAGE 3 |
| LEARNING IMAGE 4 | PART-LABEL IMAGE DATA OF LEARNING IMAGE 4 | DISTANCE IMAGE DATA OF LEARNING IMAGE 4 | JOINT POSITION DATA OF LEARNING IMAGE 4 |
| ... | ... | ... | ... |

130e

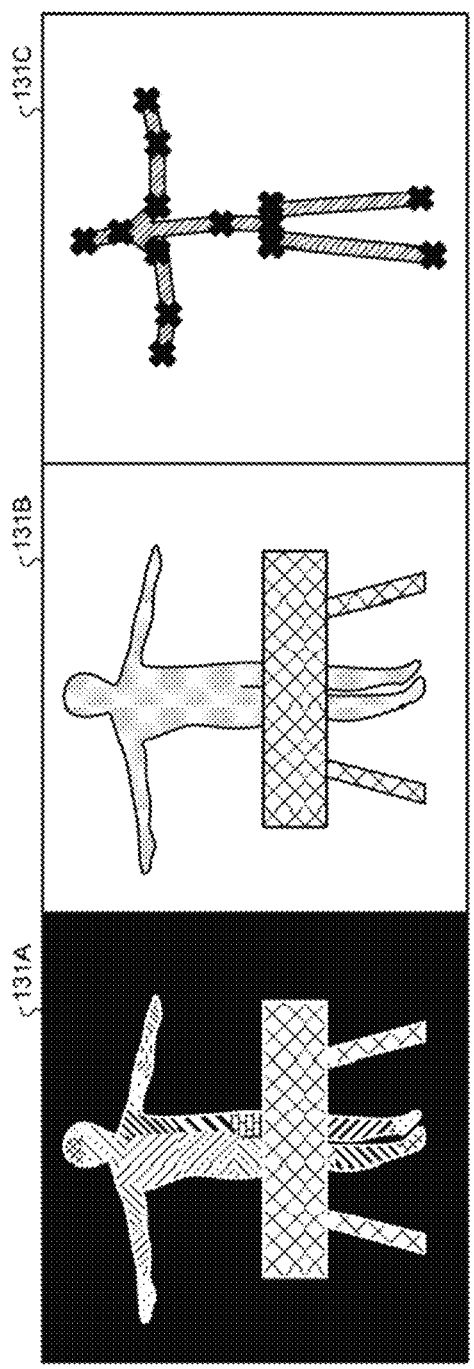

DISTANCE IMAGE PROCESSING DEVICE, DISTANCE IMAGE PROCESSING SYSTEM, DISTANCE IMAGE PROCESSING METHOD, AND NON-TRANSITORY COMPUTER READABLE RECORDING MEDIUM

CROSS-REFERENCE TO RELATED APPLICATION

This application is a continuation application of International Application PCT/JP2017/016107 filed on May, 12, 2017 and designates U.S., the entire contents of which are incorporated herein by reference.

FIELD

The present invention relates to a distance image processing device and the like.

BACKGROUND

FIG. 15 is an explanatory diagram of a conventional system that performs posture recognition. As illustrated in FIG. 15, the conventional system uses a distance sensor 6 to acquire a distance image 7 of a subject 5a. In the conventional system, by performing joint position estimation based on the distance image 7, a skeletal position 5b of the subject 5a is specified and the posture of the subject 5a is estimated.

FIG. 16 is an explanatory diagram of an application example of the conventional system. In the example illustrated in. FIG. 16, by using the distance sensor 6, a distance image of the subject 5a is acquired to recognize the posture of the subject 5a, thereby causing an avatar 5c to have the same posture as that of the subject 5a in a game.

FIG. 17 is an explanatory diagram of an example of conventional technologies for posture recognition. This conventional technology acquires one or more distance images including a human body (Step S10). For example, a distance image 1 includes a foreground pixel 1a that is related to a human body to be specified and a background pixel 1b other than the foreground pixel 1a.

In this conventional technology, by separating the background pixel 1b from the distance image 1, a distance image 1c only including a foreground pixel is obtained (Step S11). In this conventional technology, by inputting the distance image 1c in an "identifier" that identifies parts of a person, regions of the human body in the distance image 1c are divided into a plurality of part labels bp1 to bp14 (Step S12).

This conventional technology presents a plurality of suggestions of human body skeleton models having a plurality of three-dimensional skeletal positions based on the respective part labels bp1 to bp14 of the human body (Step S13). This conventional technology selects a skeleton model with the highest likelihood from the plurality of skeleton models, and recognizes the posture of the person based on the selected skeleton model (Step S14).

The identifier used in the conventional technology in FIG. 17 and the like is learned by performing processes illustrated in. FIG. 18. FIG. 18 is a flowchart illustrating a process procedure of learning a conventional identifier. As illustrated in FIG. 18, this conventional technology acquires motion capture data. (Step S20). In this conventional technology, by performing human-body model retargeting based on the motion capture data, plurality of human body models of various types of postures are generated (Step S21).

This conventional technology eliminates similar human-body model postures from each human body model and keeps only unique human-body model postures, thereby eliminating redundancy (Step S22). This conventional technology generates, based on the unique human-body model postures, respective part label images and respective distance images with an assumed distance sensor position as a reference (Step S23). As the conventional technology repeatedly learns, based on a set of a part label image and a distance image, a correspondence relation between characteristics of each position of the distance image (and characteristics of peripheral positions) and a part label, an identifier is generated (Step S24).

Patent Literature 1: Japanese Laid-open Patent Publication No. 2016-212688
Patent Literature 2: Japanese Laid-open Patent Publication No. 2015-167008
Patent Literature 3: Japanese Laid-open Patent Publication No. 2012-120647
Patent Literature 4: Japanese Laid-open Patent Publication No. 2016-091108
Patent Literature 5: U.S. Patent Application Publication No. 2015/0036879
Patent Literature 6: U.S. Patent Application Publication No. 2016/0125243

SUMMARY

According to an aspect of the embodiment of the invention, a distance image processing device includes a memory; and a processor coupled to the memory and configured to: generate a plurality of learning images in which a distance image representing a distance from a reference position to each position of the human body or each position of the object and a part image identifying each part of a human body or a part of an object are associated with each other based on a synthetic model in which a three-dimensional model of the human body and a three-dimensional model of the object are synthesized with each other; correct a value of a region corresponding to a part of the object among regions of the distance image, based on a distance image and a part image of the learning image; and learn an identifier in which characteristics of the distance image and a part of the human body or a part of the object are associated with each other, based on a plurality of learning images including a corrected distance image.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating an example of a data structure of a synthetic model table.
FIG. 6 is a diagram illustrating an example of a data structure of a learning image table.

FIG. 7 is an explanatory diagram of a relation among a part label image, a distance image, and a joint position.

DESCRIPTION OF EMBODIMENTS

However, the conventional technology described above has a problem that parts of a human body is not determined appropriately.

Figure 15:
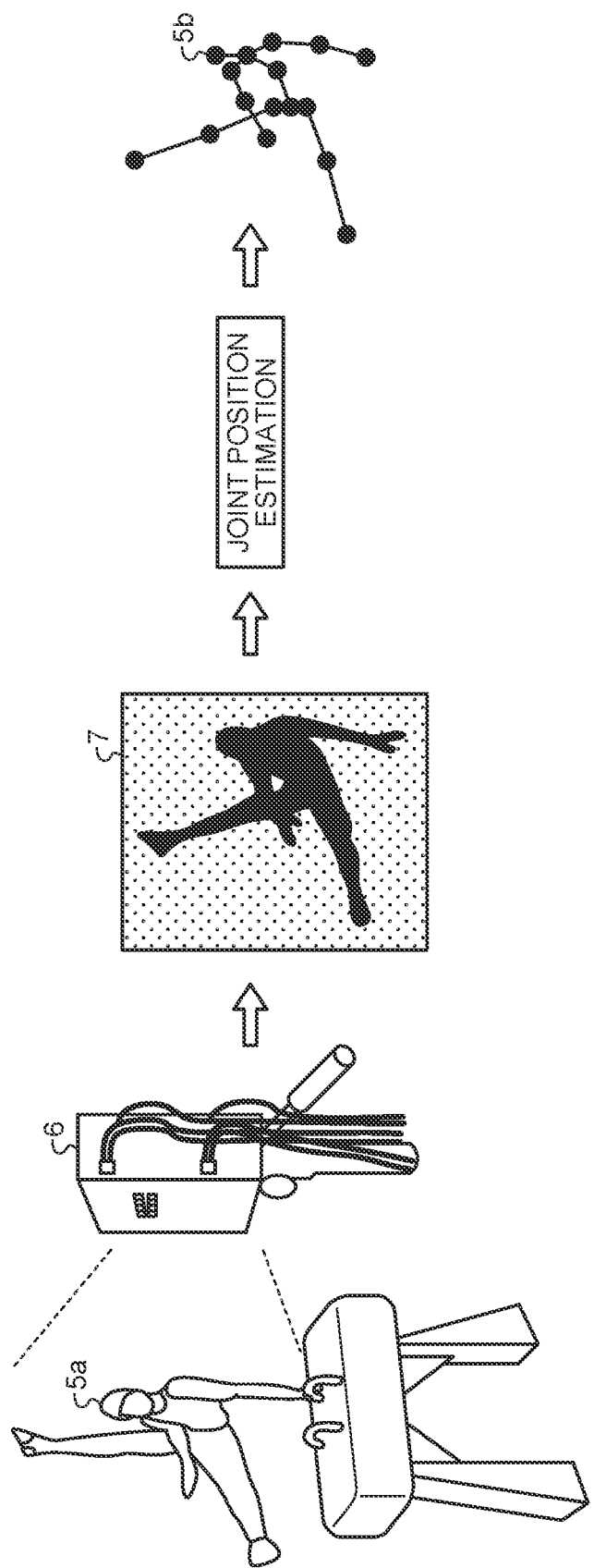
FIG. 15 is an explanatory diagram of a conventional system that performs posture recognition.
Figure 16:
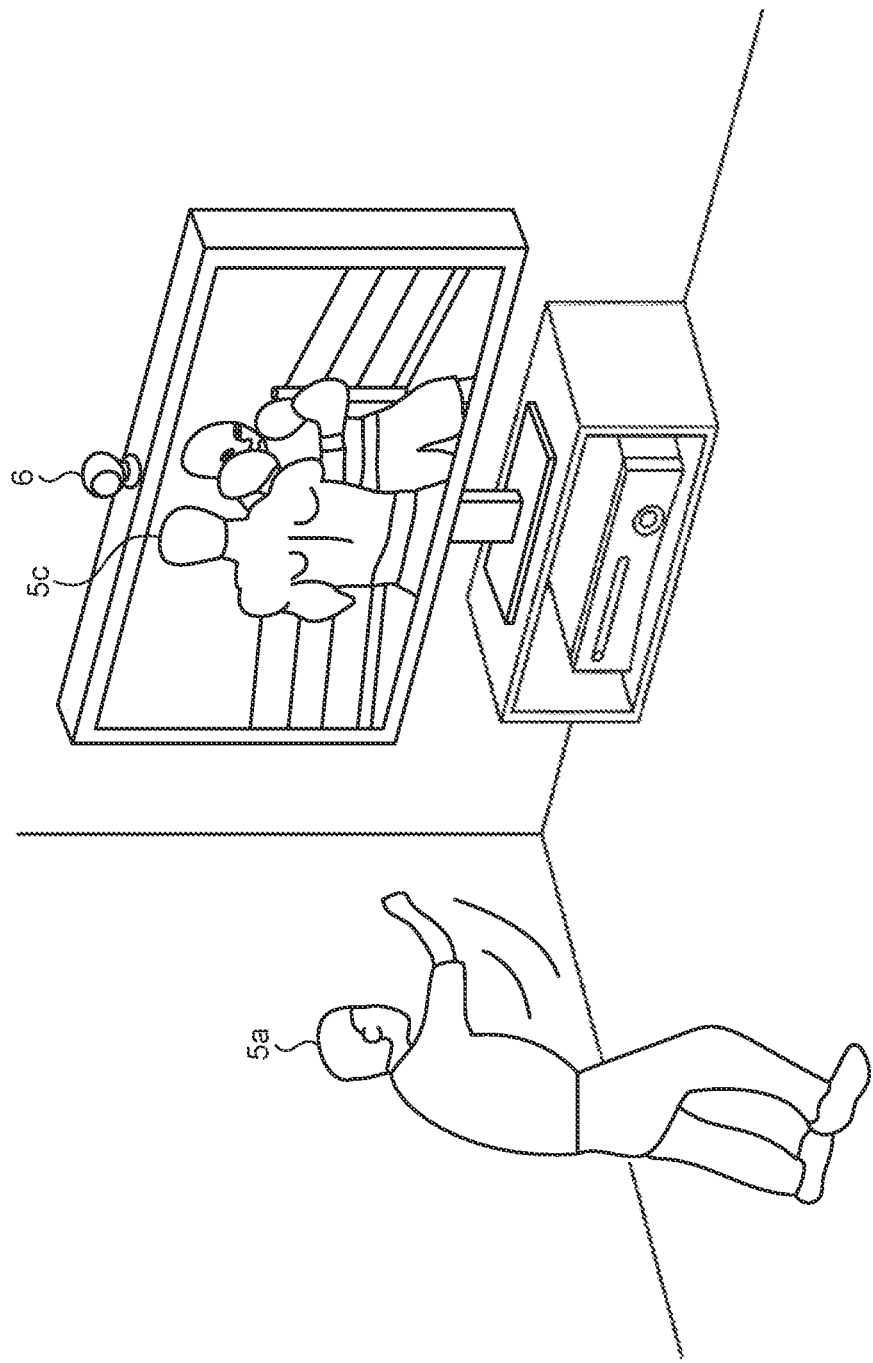
FIG. 16 is an explanatory diagram of an application example of the conventional system.

For example, when posture recognition of a human body is performed by the conventional system explained with reference to FIG. 15, occlusion due to an object occurs. The occlusion due to an object is a state where a portion of a human body as a recognition target is not visualized due to other objects.

Figure 17:
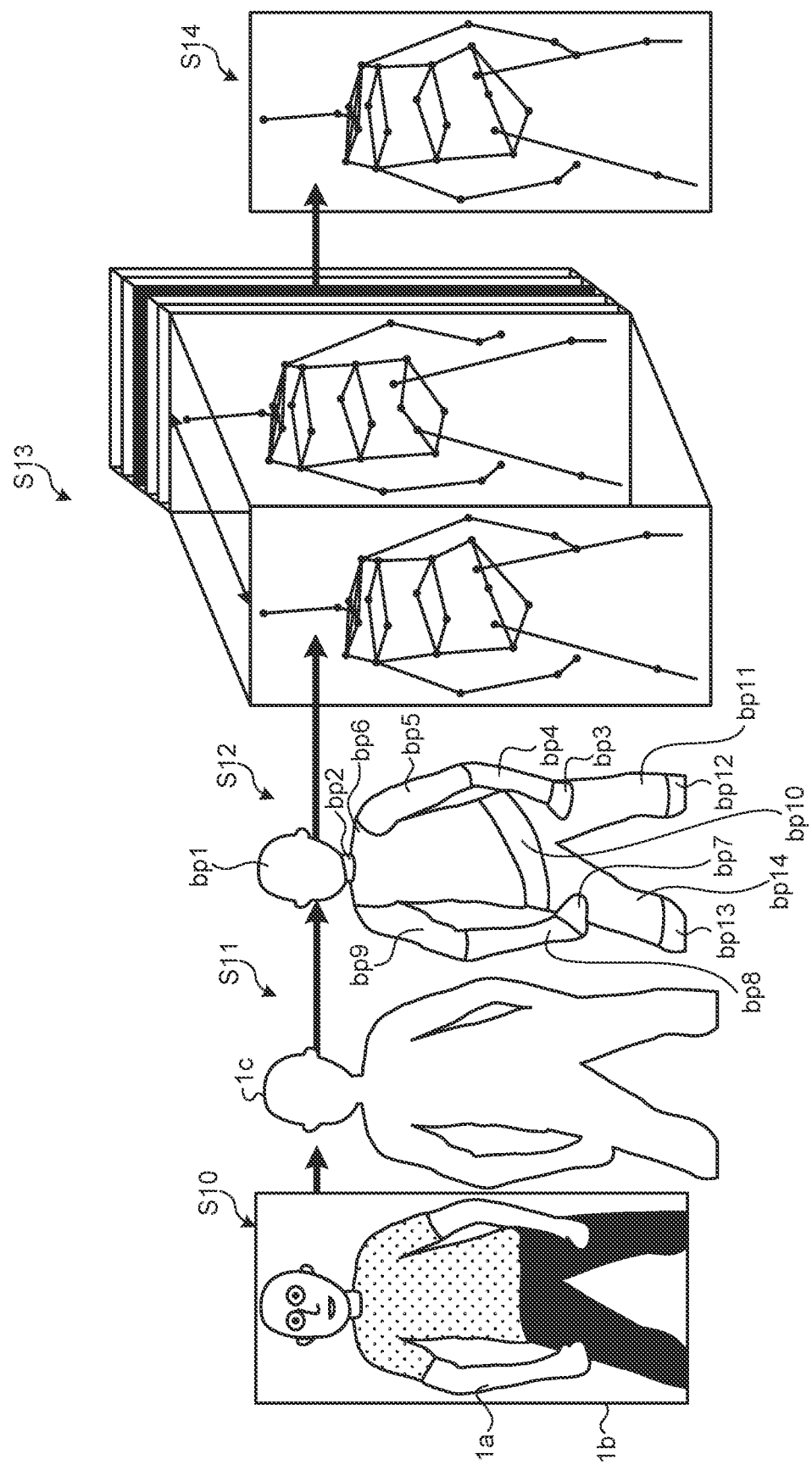
FIG. 17 is an explanatory diagram of an example of conventional technologies for posture recognition.
Figure 18:
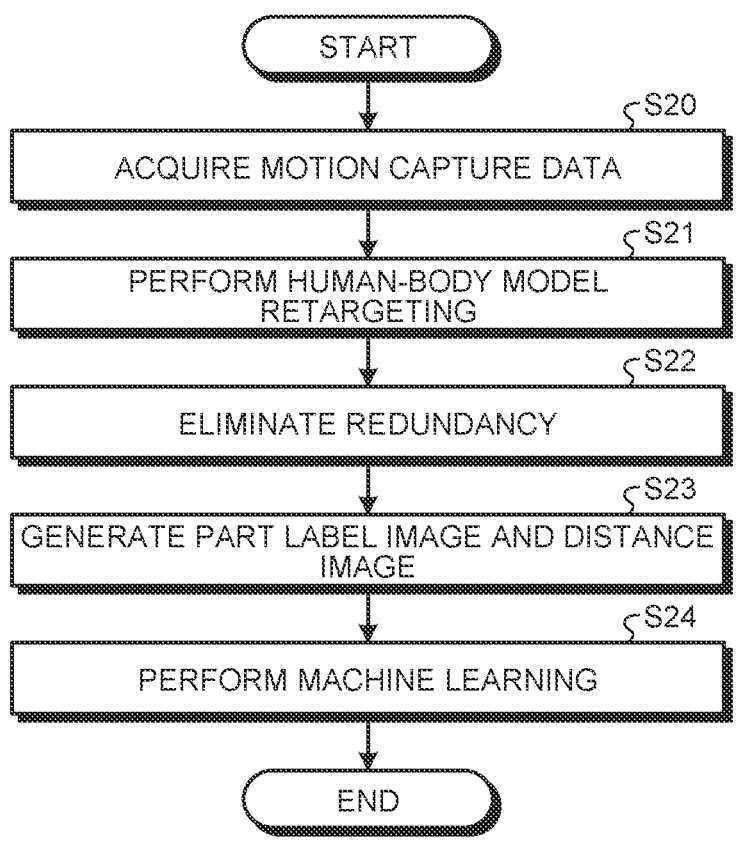
FIG. 18 is a flowchart illustrating a process procedure of learning a conventional identifier.
Figure 19:
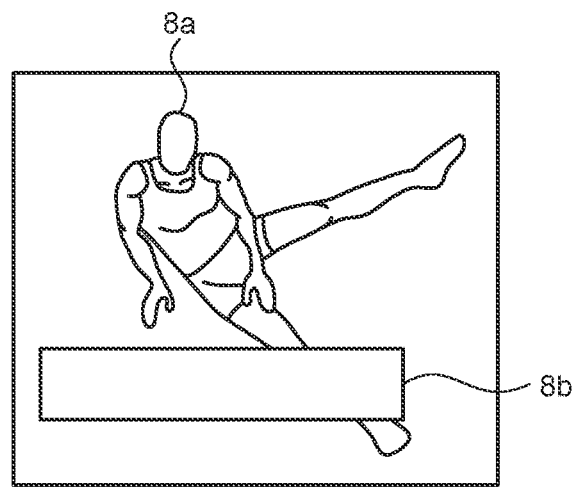
FIG. 19 is a diagram illustrating an example of occlusion due to an object.

FIG. 19 is a diagram illustrating an example of occlusion due to an object. In the example illustrated in FIG. 19, in a pommel horse performance, a portion of the body of a subject 8a exists as it is hidden behind a pommel horse 8b. When the conventional technology explained with reference to FIG. 17 is applied in a state illustrated in FIG. 20 to perform posture recognition of the subject 8a, a normal part label is not allocated and thus correct posture recognition is not performed.

Figure 20:
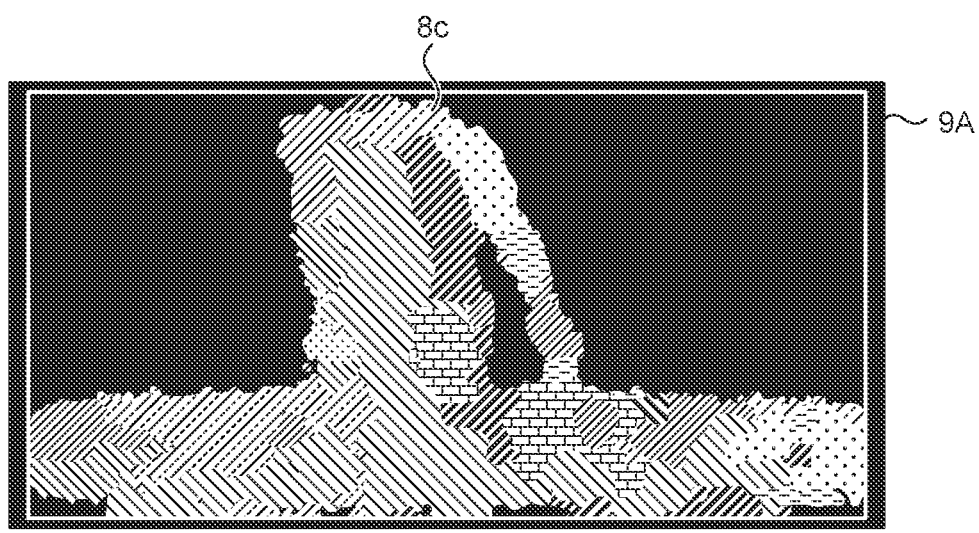
FIG. 20 is an explanatory diagram (1) of problems in conventional technologies.
Figure 21:
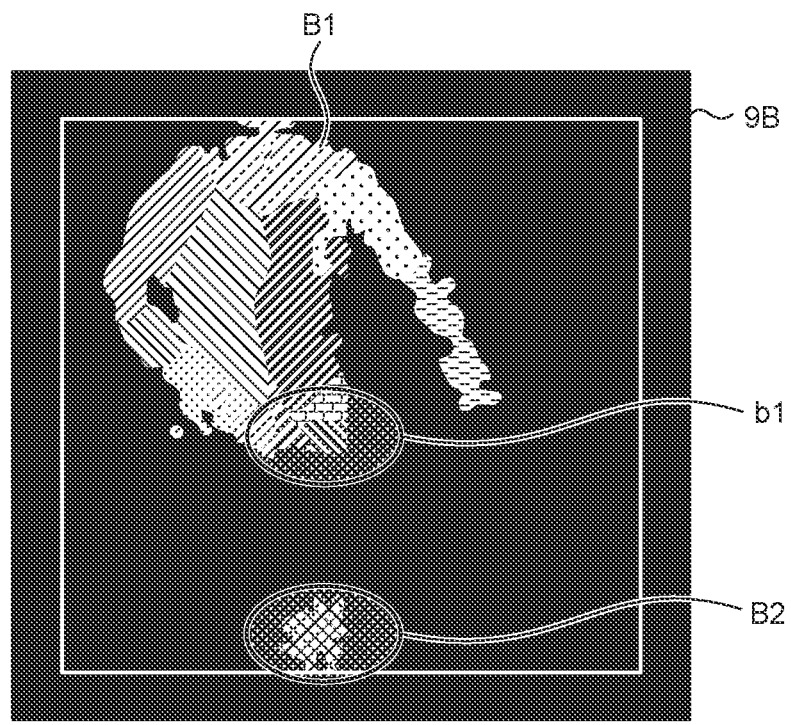
FIG. 21 is an explanatory diagram (2) of problems in conventional technologies.

FIG. 20 and FIG. 21 are explanatory diagrams of problems in conventional technologies. For example, in the conventional technologies, when a distance image including the subject 8a and the pommel horse 8b is acquired, a background is eliminated from the distance image and a part label is allocated thereto, to obtain a part-label recognition result 9A illustrated in FIG. 20 is obtained. In the conventional technologies, a part label is allocated while a region 8c including the subject 8a and the pommel horse 8b is deemed as the region of the subject 8a and the pommel horse 8b is deemed as a portion of the human body.

Meanwhile, it is possible that, in a state where the subject 8a does not exist, a distance image of only a fixed pommel horse 8b is taken in advance, and the distance image of only the pommel horse 8b is deleted from a distance image taken when the subject 8a is actually performing on the pommel horse 8b. When the distance image of only the pommel horse 8b is deleted in this manner, it is not possible to detect a distance image of a leg portion that is hidden behind the pommel horse 8b, and thus only a distance image cut by the pommel horse 8b can be obtained.

For example, when a part label is allocated to a distance image from which the distance image of the pommel horse 8b has been deleted, a part-label recognition result 9B illustrated in FIG. 21 is obtained. When a region of the human body is cut, respective cut regions $B_1$ and $B_2$ are recognized as a region of one subject, and then a part label is allocated thereto. For example, there is a case where, in the region $B_1$, a part label of a leg is allocated to a portion $b_1$, and in the region $B_2$, a part label of parts other than legs (for example, a hand) of the human body is allocated thereto.

As described above, when a part label is not determined appropriately, the accuracy of posture recognition based on the determination result of part labels is decreased.

According to one aspect, an object of the present invention is to provide a distance image processing device, a distance image processing system, a distance image processing method, and a distance image processing program that can determine parts of a human body appropriately.

An embodiment of a distance image processing device, a distance image processing system, a distance image processing method, and a distance image processing program according to the present invention will be described below in detail with reference to the accompanying drawings. The present invention is not limited to the embodiment.

Embodiment

Figure 1:
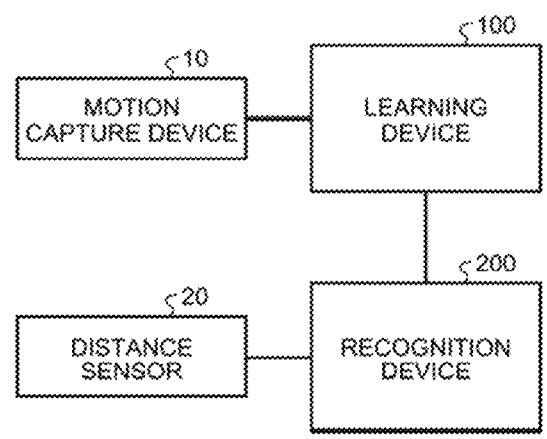
FIG. 1 is a diagram illustrating an example of a distance image processing system according to an embodiment of the present invention.

FIG. 1 is a diagram illustrating an example of a distance image processing system according to an embodiment of the present invention. As illustrated in FIG. 1, the distance image processing system includes a learning device 100 and a recognition device 200. The learning device 100 is connected to a motion capture device 10. The recognition device 200 is connected to a distance sensor 20. The learning device 100 and the recognition device 200 are connected to each other.

Figure 2:
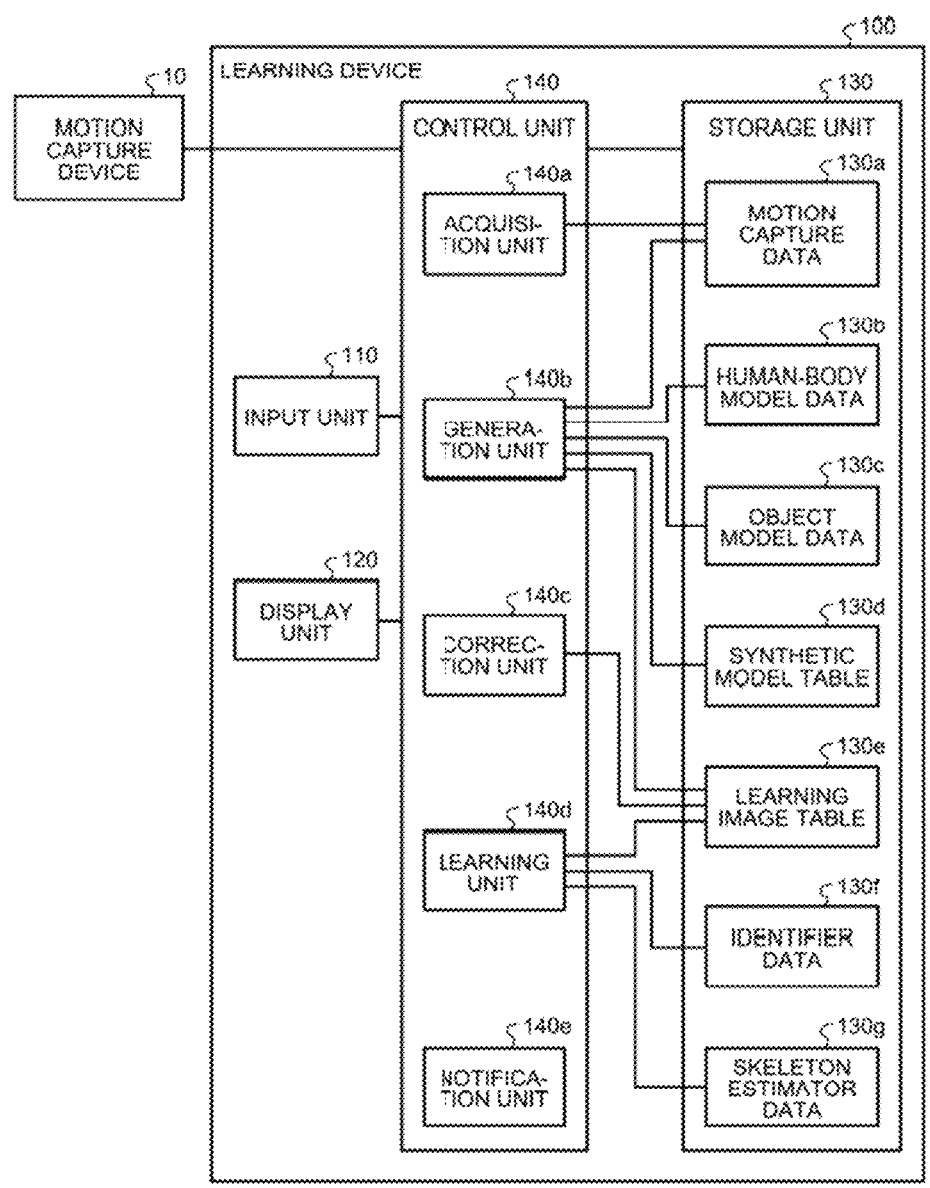
FIG. 2 is a diagram illustrating an example of a configuration of a learning device.

The learning device 100 is a device that learns an identifier and a skeleton estimator that are used when the recognition device 200 recognizes the posture of a subject. The recognition device 200 is a device that recognizes the posture of a subject by using the identifier or the skeleton estimator learned by the learning device 100. The learning device 100 and the recognition device 200 are examples of the distance image processing device, FIG. 2 is a diagram illustrating an example of a configuration of a learning device. As illustrated in FIG. 2, the learning device 100 is connected to the motion capture device 10. The learning device 100 includes an input unit 110, a display unit 120, a storage unit 130, and a control unit 140.

Figure 3:
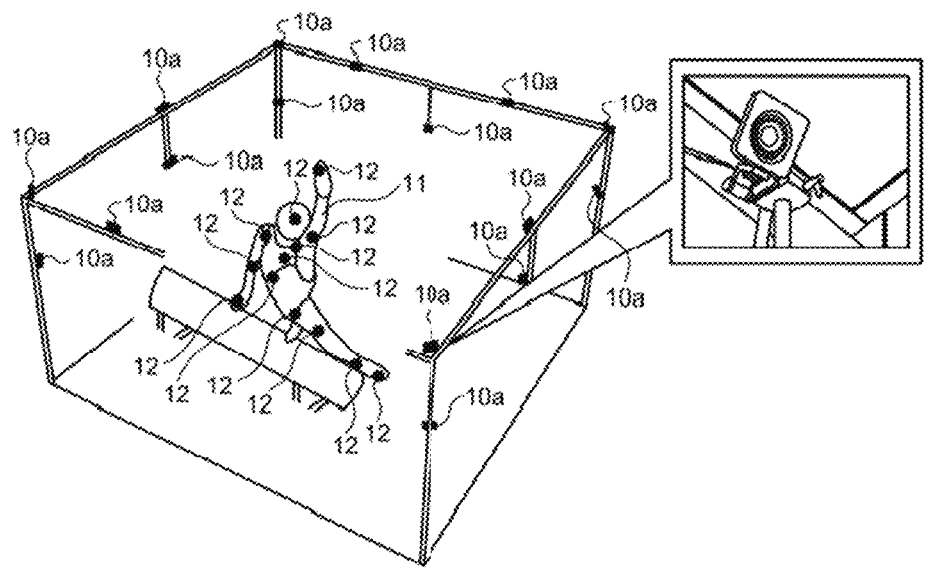
FIG. 3 is an explanatory diagram of capture cameras.

The motion capture device 10 is connected to a plurality of capture cameras 10a. FIG. 3 is an explanatory diagram of capture cameras. As illustrated in FIG. 3, the capture cameras 10a are positioned around a subject 11. A marker 12 is respectively attached to each joint position of the subject 11.

For example, the motion capture device 10 records motions of the markers 12 of the subject 11 using each capture camera 10a, and obtains a three-dimensional joint position based on the respective markers 12. By subsequently recording a three-dimensional joint position obtained based on position coordinates of the respective markers 12, the motion capture device 10 generates motion capture data. The motion capture device 10 outputs the motion capture data to the learning device 100.

Returning to the explanation of FIG. 2, the input unit 110 is an input device that inputs various types of information to the learning device 100. For example, the input unit 110 corresponds to devices such as a keyboard, mouse, and a touch panel.

The display unit 120 is a display device that displays information to be output from the control unit 140. For example, the display unit 120 corresponds to devices such as a liquid crystal display and a touch panel.

The storage unit 130 includes motion capture data 130a, human-body model data 130b, object model data 130c, a synthetic model table 130d, and a learning image table 130e. The storage unit 130 also includes identifier data 130f and skeleton estimator data 130g. The storage unit 130 corresponds to a semiconductor memory device such as a RAM (Random Access Memory), a ROM (Read Only Memory), or a flash memory and a storage device such as an HDD (Hard Disk Drive).

The motion capture data 130a is data that is generated by the motion capture device 10 and has motions of three-dimensional joint positions of a person recorded therein. For example, the motion capture data 130a includes information on joint positions in each frame.

The human-body model data 130b is data of a three-dimensional model of a human body. The human-body model data 130b is information generated by combining three-dimensional human body model to a skeleton that is based on each joint position of a person in the motion capture data 130a.

Figure 4:
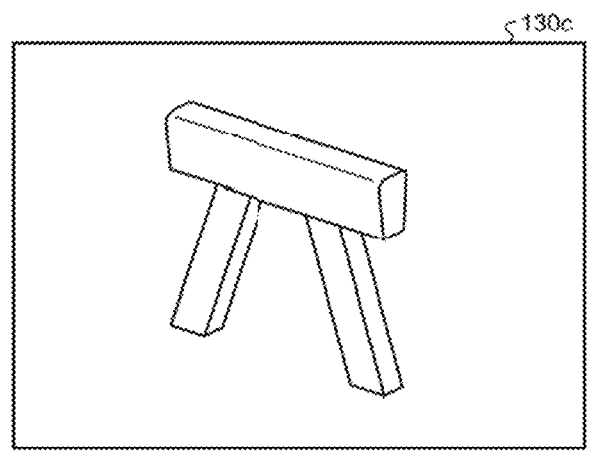
FIG. 4 is a diagram illustrating an example of object model data.

The object model data 130c is a three-dimensional model of an object that is different from a person. FIG. 4 is a diagram illustrating an example of object model data. While a pommel horse is illustrated as the object as an example, the object is not limited thereto.

The synthetic model table 130d is a table including plural pieces of synthetic model data in which the human-body model data 130b and the object model data 130c are synthesized with each other. FIG. 5 is a diagram illustrating an example of a data structure of a synthetic model table. As illustrated in FIG. 5, the synthetic model table 130d associates a synthetic model number and synthetic model data to each other. The synthetic model number is a number identifying synthetic model data. The synthetic model data is data that is obtained as a result of synthesizing the human-body model data 130b of a timing (a frame) in a series of motions and the object model data. 130c.

The learning image table 130e is a table including plural pieces of learning image data for generating the identifier data 130f and the skeleton estimator data 130g. FIG. 6 is a diagram illustrating an example of a data structure of a learning image table. As illustrated in FIG. 6, the learning image table 130e associates a learning image number, part-label image data, distance image data, and joint position data to one another.

The learning image number is a number for uniquely identifying a set of part-label image data, distance image data, and joint position data as a learning image. The part-label image data is information representing, with a unique part label, each part of synthetic model data (human body and object) and an object. The distance image data is a distance image generated from the synthetic model data (human body and object). As described later, in the region of the distance image data, the value of a region corresponding to the object is set to be the same value as that of a background. For example, the same value as that of a background is infinity. The joint position data is data generated by extracting each piece of joint position information included in a human body model of the synthetic model data. In the learning image table 130e, part-label image data, distance image data, and joint position data that are associated with one another are generated from the same synthetic model data.

While a set of part-label image data, distance image data, and joint position data has been described here as an example of a learning image, the learning image is not limited thereto. For example, a set of part-label image data and distance image data may be a learning image, and a set of joint position data and distance image data may be a learning image.

FIG. 7 is an explanatory diagram of a relation among a part label image, a distance image, and a joint position. FIG. 7 illustrates a set of part-label image data 131A, distance image data 131B, and joint position data 131C corresponding to a certain learning image number. The distance image data 131B is, for example, distance image data indicating a distance from a reference position such as a camera to each position of synthetic model data for each pixel.

The part-label image data 131A is information representing each part of a person included in the distance image data 131B and an object with a unique part label. For example, a region of the person is divided into a plurality of parts based on a predetermined division policy, and a unique part label is allocated to a region corresponding to each part. Further, as for the object, a part label different from the parts of the person is allocated to a region corresponding to the object.

The joint position data 131C is data indicating a joint position of a human body that serves as a basis of generating a human body model included in synthetic model data as a generation source of the distance image data 131B. For example, the synthetic model data includes information on each joint position of a person in the motion capture data 130a, and a part or the entirety of the information on the joint position of the person is extracted as the joint position data 131c.

The identifier data 130f constitutes an identifier that associates each pixel of a distance image to a part label based on, for example, the characteristic amount around a certain position in distance image data. When a part label of a certain position in distance image data is to be specified, by inputting the characteristic amount around a certain position in distance image data in an identifier, the part label of the certain position is output.

Figure 8:
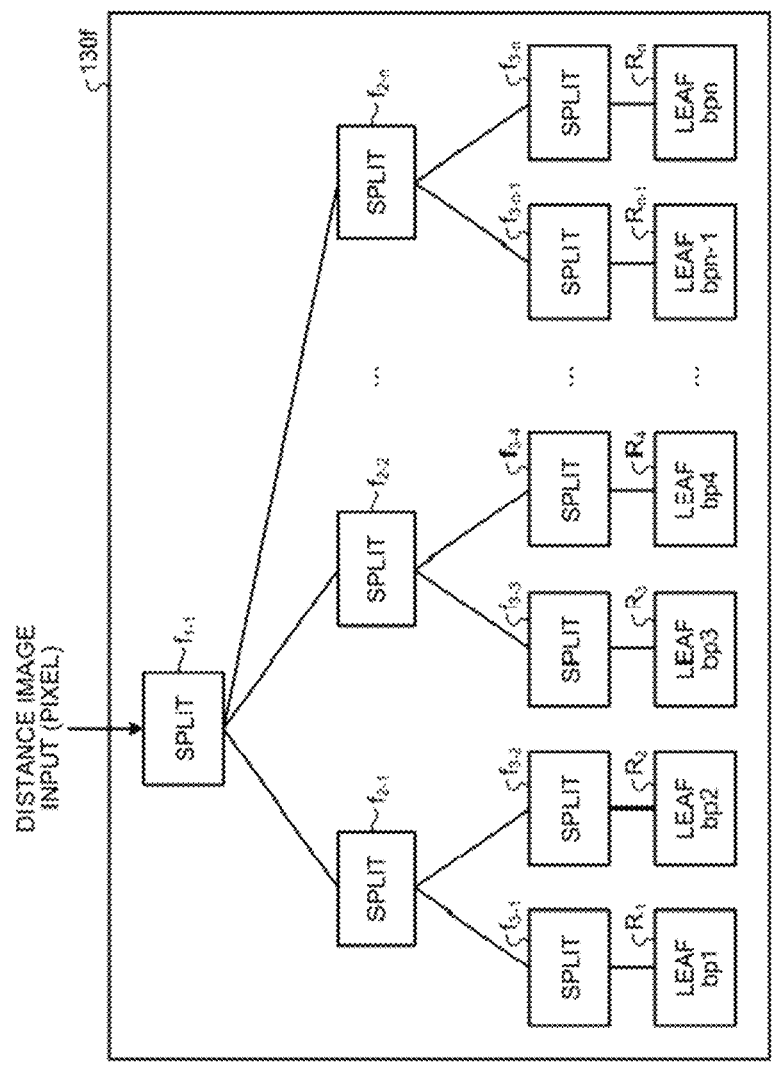
FIG. 8 is a diagram illustrating an example of a data structure of identifier data.

FIG. 8 is a diagram illustrating an example of a data structure of an identifier. As illustrated in FIG. 8, the identifier data 130f includes a plurality of split nodes $f_{1-1}$, $f_{2-1}$ to $f_{2-n}$, and $f_{3-1}$ to $f_{3-n}$, and leaf nodes $R_1$ to $R_n$. In the following descriptions, the split nodes $f_{1-1}$, $f_{2-1}$ to $f_{2-n}$, and $f_{3-1}$ to $f_{3-n}$ are collectively denoted as "split node f". The leaf nodes R1 to Rn are collectively denoted as "leaf node R".

The split node f is a node that, among subordinate split nodes f, instructs any one of splitting destinations based on the characteristic amount around a certain position in distance image data. When the split node f is any one of the split nodes $f_{3-1}$ to $f_{3-n}$, any one of transition destinations among the subordinate leaf nodes R is instructed based on the characteristic amount around a certain position in the distance image data.

The leaf node R is a node in which data indicating parts of a human body is stored.

The skeleton estimator data 130g constitutes a skeleton estimator that associates distance image data and a joint position. When a joint position of a certain position in distance image data is to be specified, by using a neural network obtained by deep learning, a joint position is output from the distance image data. At this time, the amount corresponding to the characteristic amount is automatically optimized in the neural network.

Returning to the explanation of FIG. 2, the control unit 140 includes an acquisition unit 140a, a generation unit 140b, a correction unit 140c, a learning unit 140d, and a notification unit 140e. The control unit 140 can be implemented by a CPU (Central Processing Unit), an MPU (Micro Processing Unit), and the like. The control unit 140 can be also implemented by a hard wired logic such as an ASIC (Application Specific Integrated Circuit) and an FPGA (Field Programmable Gate Array).

The acquisition unit 140a is a processing unit that acquires the motion capture data 130a from the motion capture device 10. The acquisition unit 140a stores the acquired motion capture data 130a in the storage unit 130.

The generation unit 140b is a processing unit that generates the learning image table 130e. For example, the generation unit 140b performs a process of generating the human-body model data 130b, a process of generating the synthetic model table 130d, and a process of generating the learning image table 130e. The generation unit 140b may newly generate the object model data 130c, or may use existing object model data as the object model data 130c.

The process of generating the human-body model data 130b performed by the generation unit 140b is described. The generation unit 140b acquires, from a series of motions of joint positions of a person included in the motion capture data 130a, information on joint positions of the person, and generates skeleton information on the person by connecting the respective joint positions as a skeleton. By combining parts of a human body model prepared in advance to the skeleton information, the generation unit 140b generates a human body model corresponding to the skeleton information. That is, the process performed by the generation unit 140b corresponds to a process of combining the motion capture data 130a and a human body model.

The process of generating the synthetic model table 130d performed by the generation unit 140b is described. The generation unit 140b acquires a human body model with respect to a series of motion capture data 130a from the human-body model data 130b, and generates synthetic model data by synthesizing the acquired human body model and the object model of the object model data 130c. By repeating a process of synthesizing a human body model corresponding to another frame and the object model to each other, the generation unit 140b generates plural pieces of synthetic model data. The generation unit 140b registers the synthetic model data in the synthetic model table 130d while associating a synthetic model number to each piece of the synthetic model data.

When similar pieces of synthetic model data are included in the plural pieces of synthetic model data registered in the synthetic model table 130d, the generation unit 140b may perform a process of eliminating redundancy. For example, the generation unit 140b determines pieces of synthetic model data having a total value of differences of respective joint positions in the synthetic model data being less than a threshold as similar pieces of synthetic model data. The generation unit 140b leaves one piece of synthetic model data among the similar pieces of synthetic mode data, and performs a process of deleting other pieces of synthetic model data.

The process of generating the learning image table 130e performed by the generation unit 140b is described. The generation unit 140b refers to the synthetic model table 130d and acquires synthetic model data of a certain synthetic model number. The generation unit 140b generates part-label image data and distance image data based on the acquired synthetic model data. The generation unit 140b respectively associates the part-label image data and the distance image data with a learning image number and registers these pieces of data in the learning image table 130e.

For example, the generation unit 140b positions part labels for identifying parts of a human body in synthetic model data in advance. The generation unit 140b sets a virtual reference position on a three-dimensional image, and generates distance image data in a case of viewing the synthetic model data from the reference position. Further, the generation unit 140b generates part-label image data while classifying a region of synthetic model data in a case of viewing the synthetic model data from a reference position into a plurality of part labels. For example, part-label image data and distance image data generated from the same synthetic model data respectively correspond to the part-label image data 131A and the distance image data 131B explained with reference to FIG. 7.

Further, the generation unit 140b generates joint position data by extracting information on joint positions of a human body from a human body model constituting synthetic model data. The joint position data corresponds to the joint position data 131C explained with reference to FIG. 7, and is at least associated with the distance image data 131B.

By repeatedly performing the processes described above for other pieces of synthetic model data stored in the synthetic model table 130d, the generation unit 140b generates part-label image data, distance image data, and joint position data, and stores these pieces of data in the learning image table 130e.

The correction unit 140c is a processing unit that corrects the part-label image data and the distance image data in the learning image table 130e. For example, the correction unit 140c compares the part-label image data and the distance image data associated in the learning image table 130e, and specifies a region of an object from the regions of the distance image data. The correction unit 140c corrects the value of the region of the object in the distance image data to be the same value as the value of a background. For example, the correction unit 140c sets the value of the region of the object in the distance image data as "infinity". Further, the correction unit 140c corrects the part label of the object included in the part-label image data to a label representing a background.

By repeatedly performing the processes described above for other pieces of part-label image data and other pieces of distance image data stored in the learning image table 130e, the correction unit 140c corrects the other pieces of part-label image data and the other pieces of distance image data. As the correction unit 140c performs such processes, the object (an object such as a pommel horse) included in the distance image data can be handled as a background.

The learning unit 140d is a processing unit that repeatedly performs machine learning based on a learning set of plural pieces of part-label image data and plural pieces of distance image data included in the learning image table 130e to generate the identifier data 130f. Further, the learning unit 140d performs learning by using deep learning and the like based on a learning set of plural pieces of distance image data and plural pieces of joint position data included in the learning image table 130e to generate the skeleton estimator data 130g.

An example of the process of generating first identifier data 130f performed by the learning unit 140d is described. The learning unit 140d specifies the characteristic amount around a certain position (x1, y1) in distance image data and a part label corresponding to the certain position (x1, y1). For example, the characteristic amount around the certain position (x1, y1) may be irregularities of peripheral distance image data with the certain position (x1, y1) in the distance image data as the reference thereof, and may be other types of characteristic amount. The part label corresponding to the certain position (x1, y1) corresponds to a part label allocated to the certain position (x1, y1) in the part-label image data.

Similarly, the learning unit 140d specifies a pattern of the characteristic amount around a certain position (xn, yn) in distance image data and a part label corresponding to the certain position (xn, yn) for each different position. The learning unit 140d generates (learns) the identifier data 130f by repeatedly performing machine learning on the respective patterns in different positions.

An example of the process of generating the skeleton estimator data 130g performed by the learning unit 140d is described. The learning unit 140d uses deep learning to learn a relation between distance image data and joint position data in a mode that the characteristic amount is automatically optimized.

Similarly, the learning unit 140d specifies a pattern of the characteristic amount of the certain position (xn, yn) in distance image data, the characteristic amount around the certain position (xn, yn), and a joint position corresponding to the certain position (xn, yn) for each different position. The learning unit 140d generates (learns) the skeleton estimator data 130g by repeatedly performing machine learning on the respective patterns in different positions.

The notification unit 140e is a processing unit that transmits the identifier data 130f and the skeleton estimator data 130g generated by the learning unit 140d to the recognition device 200.

Figure 9:
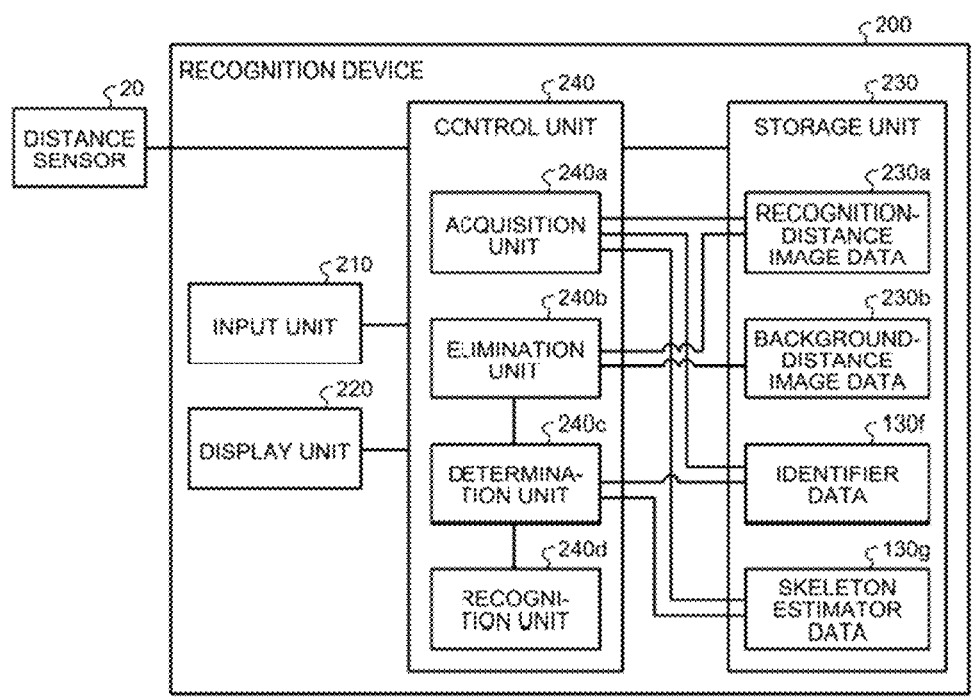
FIG. 9 is a diagram illustrating an example of a configuration of a recognition device.

Next, the recognition device 200 is described. FIG. 9 is a diagram illustrating an example of a configuration of a recognition device. As illustrated in FIG. 9, the recognition device 200 is connected to the distance sensor 20. The recognition device 200 includes an input unit 210, a display unit 220, a storage unit 230, and a control unit 240.

The distance sensor 20 measures a distance image of a subject and a predetermined object (such as a pommel horse, not illustrated) at the time of performing a posture recognition process, and outputs data of the measured distance image to the recognition device 200. In the following descriptions, data of distance images acquired from the distance sensor 20 is denoted as recognition-distance image data 230a. In the present embodiment, descriptions are made on the assumption that the predetermined object is a pommel horse.

The input unit 210 is an input device that inputs various types of information to the recognition device 200. For example, the input unit 210 corresponds to devices such as a keyboard, a mouse, and a touch panel.

The display unit 220 is a display device that displays information to be output from the control unit 240. For example, the display unit 220 corresponds to devices such as a liquid crystal display and a touch panel.

The storage unit 230 includes the recognition-distance image data 230a, background-distance image data 230b, the identifier data 130f, and the skeleton estimator data 130g. The storage unit 130 corresponds to a semiconductor memory device such as a RAM, a ROM, or a flash memory and a storage device such as an HDD.

The recognition-distance image data 230a is distance image data measured by the distance sensor 20 at the time of performing recognition. The recognition-distance image data 230a, is data indicating the distance from the distance sensor 20 to a subject and an object for each position (pixel).

The background-distance image data 230b is distance image data of only a background captured by the distance sensor 20 in a state where any subject does not exist. The predetermined object illustrated in FIG. 4 exists in the background-distance image data (the predetermined object is described here as "background" even when the object exists in front of a person). An acquisition unit 240a acquires the background-distance image data 230b from the distance sensor 20 in advance, and stores the acquired background-distance image data 230b in the storage unit 230.

The identifier data 130f is identifier data that is generated by the learning device 100. The data structure of the identifier data 130f corresponds to the data structure explained with reference to FIG. 8.

The skeleton estimator data 130g is skeleton estimator data that is generated by the learning device 100.

The control unit 240 includes the acquisition unit 240a, an elimination unit. 240b, a determination unit. 240c, and a recognition unit 240d. The control unit 240 can be implemented by a CPU, an MPU, and the like. The control unit 240 can be also implemented by a hard wired logic such as an ASIC and an FPGA.

The acquisition unit 240a acquires the recognition-distance image data 230a from the distance sensor 20 and stores the acquired recognition-distance image data 230a in the storage unit 230. The acquisition unit 240a acquires the identifier data 130f and the skeleton estimator data 130g from the learning device 100 and stores the acquired identifier data 130f and skeleton estimator data 130g in the storage unit 230.

The elimination unit is a processing unit that eliminates information on a background and a predetermined object from the recognition-distance image data 230a by obtaining a difference between the recognition-distance image data 230a and the background-distance image data 230b. The elimination unit 240b outputs distance image data obtained by eliminating background information from the recognition-distance image data 230a to the determination unit 240c. In the following descriptions, the distance image data obtained by eliminating background information from the recognition-distance image data 230a is denoted simply as "distance image data".

The determination unit. 240c is a processing unit that selects the identifier data 130f or the skeleton estimator data 130g to determine a part label or to determine a joint position.

The process of selecting the identifier data 130f to determine a part label performed by the determination unit 240c is described. The determination unit. 240c determines a corresponding part label for each position (pixel) of distance image data based on the distance image data acquired from the elimination unit 240b and the identifier data 130f.

For example, the determination unit 240c compares the characteristic amount around the distance image data and each split node f of the identifier data 130f, follows each split node f, and sets the part label indicated at the leaf node of the following destination as a part label of a determination result. The determination unit 240c determines respective part labels corresponding to all pieces of distance image data by repeatedly performing the processes described above also for other pixels. The determination unit 240c outputs a first determination result in which each position of the distance image data and a part label are associated with each other to the recognition unit 240d.

The process of selecting the skeleton estimator data 130g to determine a joint position performed by the determination unit 240c is described. The determination unit 240c estimates, based on distance image data acquired from the elimination unit 240b and the skeleton estimator data 130g, a corresponding joint position from the distance image data.

For example, the determination unit 240c uses a deep neural network and the like to output a second determination result in which a joint position is associated from the distance image data to the recognition unit 240d.

The recognition unit 240d is a processing unit that recognizes the posture of a subject based on the first determination result or the second determination result of the determination unit 240c. For example, the recognition unit 240d presents a plurality of suggestions of human body skeleton models having a plurality of three-dimensional positions based on part labels of a human body included in the first determination result. The recognition unit 240d selects a skeleton model with the highest likelihood from the plurality of skeleton models and recognizes the posture of the subject based on the selected skeleton model.

The recognition unit 240d generates a skeleton model based on a joint position of a human body included in the second determination result and recognizes the posture of the subject based on the generated skeleton model.

Figure 10:
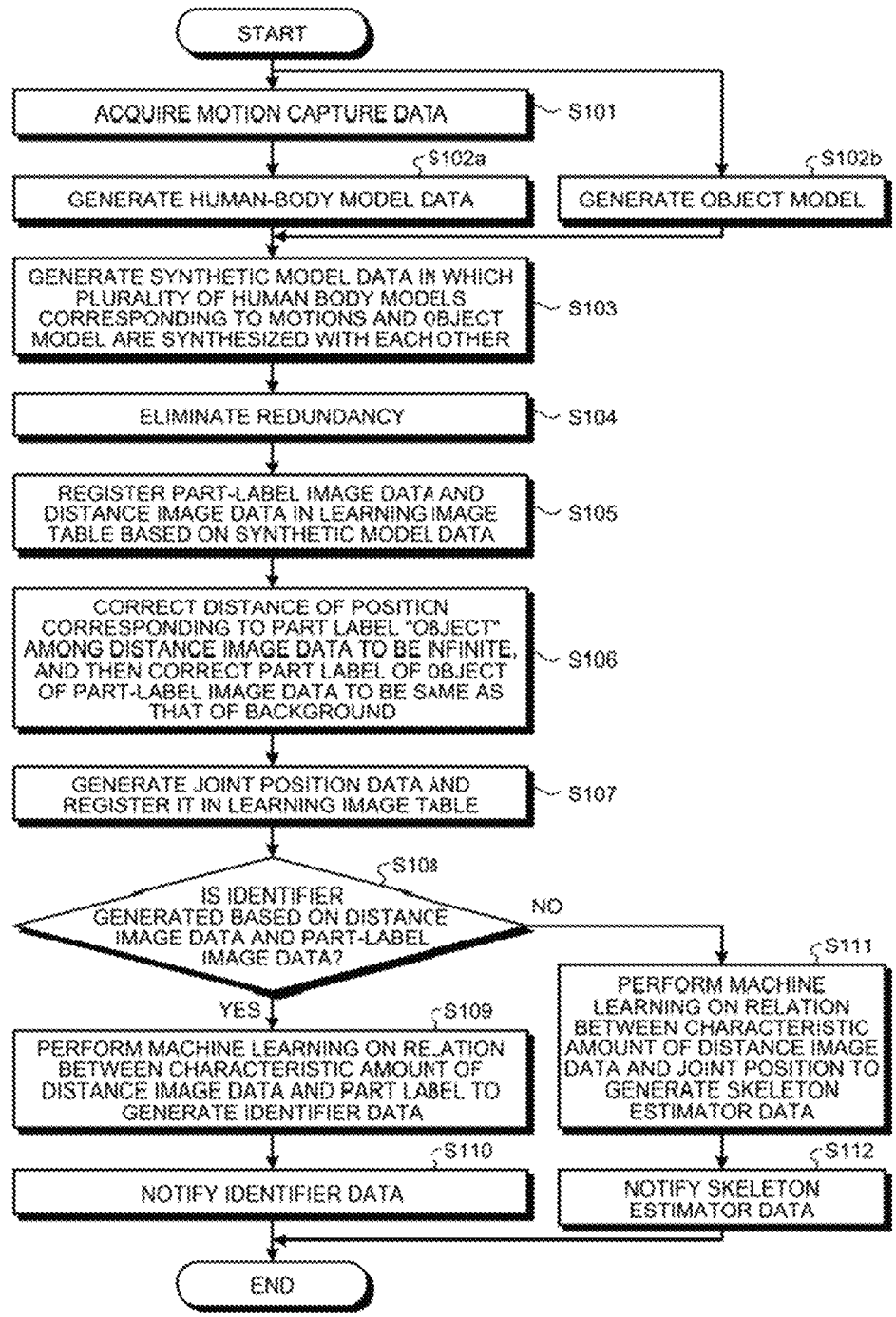
FIG. 10 is a flowchart illustrating a process procedure of the learning device according to the present embodiment.

Next, a process procedure of the learning device and a process procedure of the recognition device 200 according to the present embodiment are described. FIG. 10 is a flowchart illustrating a process procedure of a learning device according to the present embodiment. As illustrated in FIG. 10, the acquisition unit 140a of the learning device 100 acquires the motion capture data 130a from the motion capture device 10 (Step S101).

The generation unit 140b of the learning device 100 generates the human-body model data 130b (Step S102a). The generation unit 140b generates the object model data 130c (Step S102b). The generation unit 140b may use object model data generated in advance as the object model data 130c.

The generation unit 140b generates synthetic model data in which a plurality of human body models corresponding to motions and an object model are synthesized with each other (Step S103). The generation unit 140b eliminates redundancy from the synthetic model table 130d (Step S104).

The generation unit 140b registers, based on the synthetic model data, part-label image data and distance image data in the learning image table 130e (Step S105).

The correction unit 140c of the learning device 100 corrects, among the distance image data, the distance of a position corresponding to a part label "object" to be infinite, and then corrects the part label of the object of the part-label image data to be the same as that of a background (Step S106).

The generation unit 140b generates joint position data and registers the generated joint position data in the learning image table 130e (Step S107).

The learning unit 140d of the learning device 100 proceeds, based on the distance image data and the part-label image data, to Step S109 when an identifier is to be generated (YES at Step S108). The learning unit 140d proceeds, based on the distance image data and the part-label image data, to Step S111 when an identifier is not to be generated (NO at Step S108).

The learning unit 140d performs machine learning on a relation between the characteristic amount of the distance image data and a part label to generate the identifier data 130f (Step S109). The notification unit 140e of the learning device 100 notifies the recognition device 200 of the identifier data 130f (Step S110).

The learning unit 140d performs machine learning on a relation between the characteristic amount of the distance image data and a joint position to generate the skeleton estimator data 130g (Step S111). The notification unit 140e of the learning device 100 notifies the recognition device 200 of the skeleton estimator data 130g (Step S112).

Figure 11:
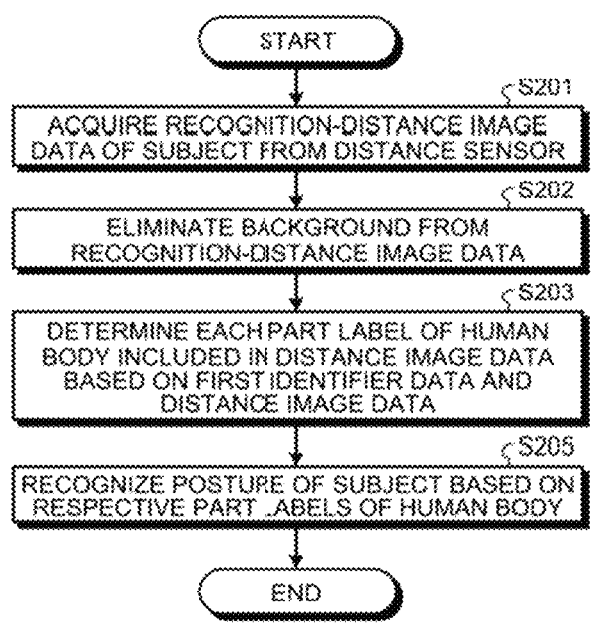
FIG. 11 is a flowchart (1) illustrating a process procedure of the recognition device according to the present embodiment.

FIG. 11 is a flowchart (1) illustrating a process procedure of the recognition device according to the present embodiment. In the process illustrated in FIG. 11, it is assumed that the recognition device 200 uses the identifier data 130f to perform the process. The acquisition unit 240a of the recognition device 200 acquires the recognition-distance image data 230a from the distance sensor 20 (Step S201).

The elimination unit 240b of the recognition device 200 eliminates a background and a predetermined object from the recognition-distance image data 230a (Step S202). The determination unit 240c of the recognition device 200 determines each part label of a human body included in the distance image data based on the identifier data 130f and the distance image data (Step S203).

The recognition unit 240d of the recognition device 200 recognizes the posture of a subject based on the respective part labels of the human body (Step S205).

Figure 12:
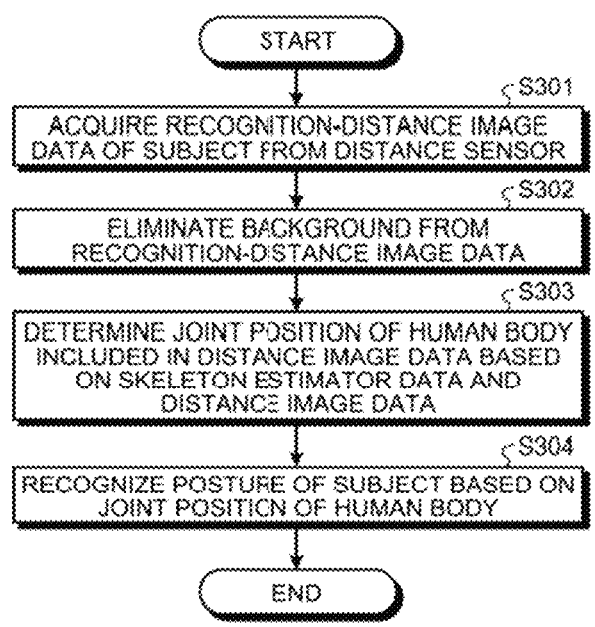
FIG. 12 is a flowchart (2) illustrating a process procedure of the recognition device according to the present embodiment.

FIG. 12 is a flowchart (2) illustrating a process procedure of the recognition device according to the present embodiment. In the process illustrated in FIG. 12, it is assumed that the recognition device 200 uses the skeleton estimator data 130g to perform the process. The acquisition unit 240a of the recognition device 200 acquires the recognition-distance image data 230a from the distance sensor 20 (Step S301).

The elimination unit 240b of the recognition device 200 eliminates a background and a predetermined object from the recognition-distance image data 230a (Step S302). The determination unit 240c of the recognition device 200 determines the joint position of a human body included in the distance image data based on the skeleton estimator data 130g and the distance image data (Step S303).

The recognition unit 240d of the recognition device 200 recognizes the posture of a subject based on the joint position of the human body (Step S304).

Next, effects of the learning device 100 and the recognition device 200 according to the present embodiment are described. The generation unit 140b of the learning device 100 generates a plurality of learning images in which distance image data and a part label image are associated with each other based on synthetic model data in which the human-body model data 130b and the object model data 130c are synthesized with each other. The learning device 100 corrects the value corresponding to the region of the object of the distance image data to be the same value as the value of the background and performs machine learning on the plurality of learning images to generate the first identifier data 130f in which characteristics of distance image data and a part label of a human body are associated with each other.

The first identifier data 130f is an identifier in which characteristics of distance image data and a part label of a human body are associated with each other, and thus even when a human body and an object exist simultaneously at the time of acquiring a distance image, it is possible to eliminate the influences of the object to specify each part label of the human body from the distance image data.

The learning device 100 generates a plurality of learning images in which distance image data and joint position data are associated with each other. By performing machine learning on the plurality of learning images, the learning device 100 generates the skeleton estimator data 130g in which the characteristics of the distance image data and a joint position of a human body are associate with each other. The skeleton estimator data 130g is an identifier in which characteristics of distance image data and a joint position of a human body are associated with each other, and thus even when a human body and an object exist simultaneously at the time of acquiring a distance image, it is possible to eliminate the influences of the object to specify the joint position of the human body.

The recognition device 200 uses distance image data obtained by deleting a background and a predetermined object from the recognition-distance image data 230a that is acquired from the distance sensor 20 and the identifier data 130f to determine a part label of a subject. Accordingly, even when a human body and an object exist simultaneously at the time of acquiring a distance image, it is possible to eliminate the influences of the object to specify the part label of the human body in the distance image data. That is, even when there is occlusion due to the object, it is possible to perform correct part recognition.

The recognition device 200 uses distance image data obtained by deleting a background and a predetermined object from the recognition-distance image data 230a that is acquired from the distance sensor 20 and the skeleton estimator data 130g to determine a joint position of a subject. Accordingly, even when a human body and an object exist simultaneously at the time of acquiring a distance image, it is possible to eliminate the influences of the object to specify the joint position of the human body. That is, even when there is occlusion due to the object, it is possible to perform correct part recognition.

The contents of the embodiment described above are only examples, and the processes performed by the learning device 100 and the recognition device 200 are not limited to the processes described above. Other processes 1 to 3 are described below.

The other process 1 is described. In the processes described above, it has been explained that the learning device 100 corrects, among respective parts of a human body and a part of an object included in distance image data, the value of a region of the part of the object to the value of a background; however, the present invention is not limited thereto. For example, as for distance image data, the correction unit 140c of the learning device 100 also corrects the value of a region corresponding to a part of hair of a human body to the value of the background. Further, the correction unit 140c may correct a part label of a hair portion of a human body in part-label image data to a background. For example, when the color of hair is black, there is a case where laser light of the distance sensor 20 is not reflected and is lost from distance image data. Therefore, by deleting the part of hair of the person to generate a learning image and the identifier data 130f, it is possible to further increase the recognition accuracy of part labels.

The other process 2 is described. In the above descriptions, it has been explained that the learning device 100 repeatedly learns a pattern of distance image data and joint position data including all the joint positions of a human body to generate the skeleton estimator data 130g; however, the present invention is not limited thereto. For example, even when a portion of joint positions of a human body is not acquired due to the influence of an object, the learning unit 140d of the learning device 100 may generate the skeleton estimator data 130g by repeatedly learning a pattern of distance image data and joint position data including joint positions of a human body (a portion thereof is missing due to the influence of an object).

The other process 3 is described. In the processes described above, it has been explained that the learning device 100 generates the identifier data 130f and the skeleton estimator data 130g, and the recognition device 200 recognizes the posture of a subject by using the identifier data 130f and the skeleton estimator data 130g; however, the present invention is not limited thereto. For example, the distance image processing device that performs the processes of the learning device 100 and the recognition device 200 may perform processes corresponding to the embodiment described above. For example, in a "learning phase", the distance image processing device generates the identifier data 130f and the skeleton estimator data 130g by performing processes identical to those of the control unit 140 illustrated in FIG. 2. In a "recognition phase", the distance image processing device uses the identifier data 130f and the skeleton estimator data 130g having been learned in the learning phase to perform processes identical to those of the control unit 240 illustrated in FIG. 9 to recognize the posture of a subject.

Figure 13:
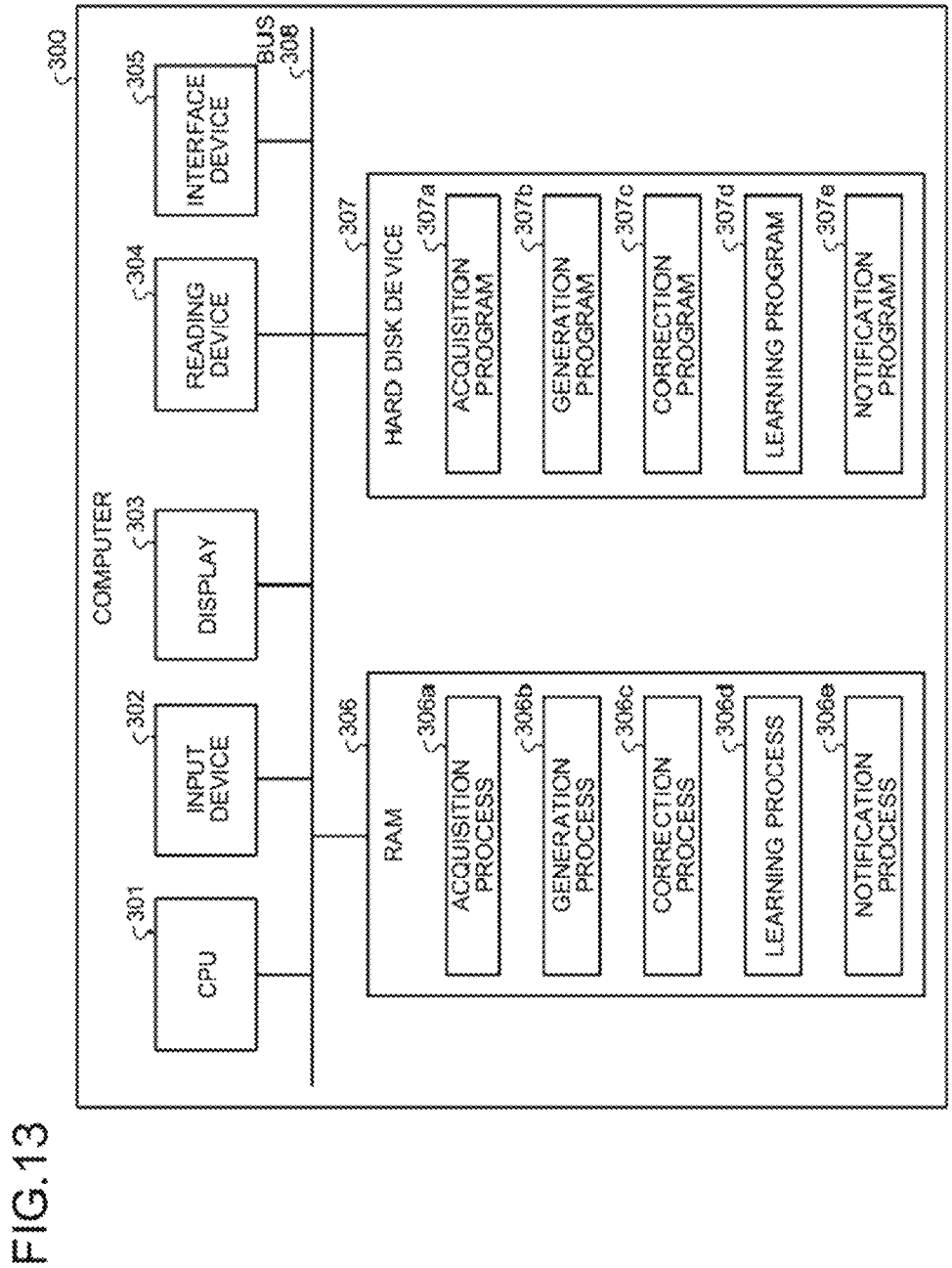
FIG. 13 is a diagram illustrating an example of a hardware configuration of a computer that realizes functions identical to those of the learning device.

Next, an example of a hardware configuration of a computer that realizes functions similar to those of the learning device 100 and the recognition device 200 described in the above embodiment is described. FIG. 13 is a diagram illustrating an example of a hardware configuration of a computer that realizes functions identical to those of the learning device.

As illustrated in FIG. 13, a computer 300 includes a CPU 301 that performs various types of calculation processes, an input device 302 that receives input of data from a user, and a display 303. The computer 300 also includes a reading device 304 that reads programs and the like from a storage medium and an interface device 305 that transmits and receives data between another computer (a calibration device 10 or the like) via a wired or wireless network. The computer 300 also includes a RAM 306 that temporarily stores various types of information therein and a hard disk device 307. The respective devices 301 to 307 are connected to a bus 308.

The hard disk device 307 includes an acquisition program 307a, a generation program 307b, a correction program 307c, a learning program 307d, and a notification program 307e. The CPU 301 reads the acquisition program 307a, the generation program 307b, the correction program 307c, the learning program 307d, and the notification program 307e and loads these programs into the RAM 306.

The acquisition program 307a functions as an acquisition process 306a. The generation program 307b functions as a generation process 306b. The correction program 307c functions as a correction process 306c. The learning program 307d functions as a learning process 306d. The notification program 307e functions as a notification process 306e.

The processing of the acquisition process 306a corresponds to the processing of the acquisition unit 140a. The processing of the generation process 306b corresponds to the processing of the generation unit 140b. The processing of the correction process 306c corresponds to the processing of the correction unit 140c. The processing of the learning process 306d corresponds to the processing of the learning unit 140d. The processing of the notification process 306e corresponds to the processing of the notification unit 140e.

The programs 307a to 307e do not always need to be stored in the hard disk device 307 initially. For example, the respective programs are stored in a "portable physical medium" such as a flexible disk (FD), a CD-ROM, a DVD disk, a magneto-optical disk, and an IC card that are inserted into the computer 300. It is possible to configure that the computer 300 subsequently reads the respective programs 307a to 307e to execute them.

Figure 14:
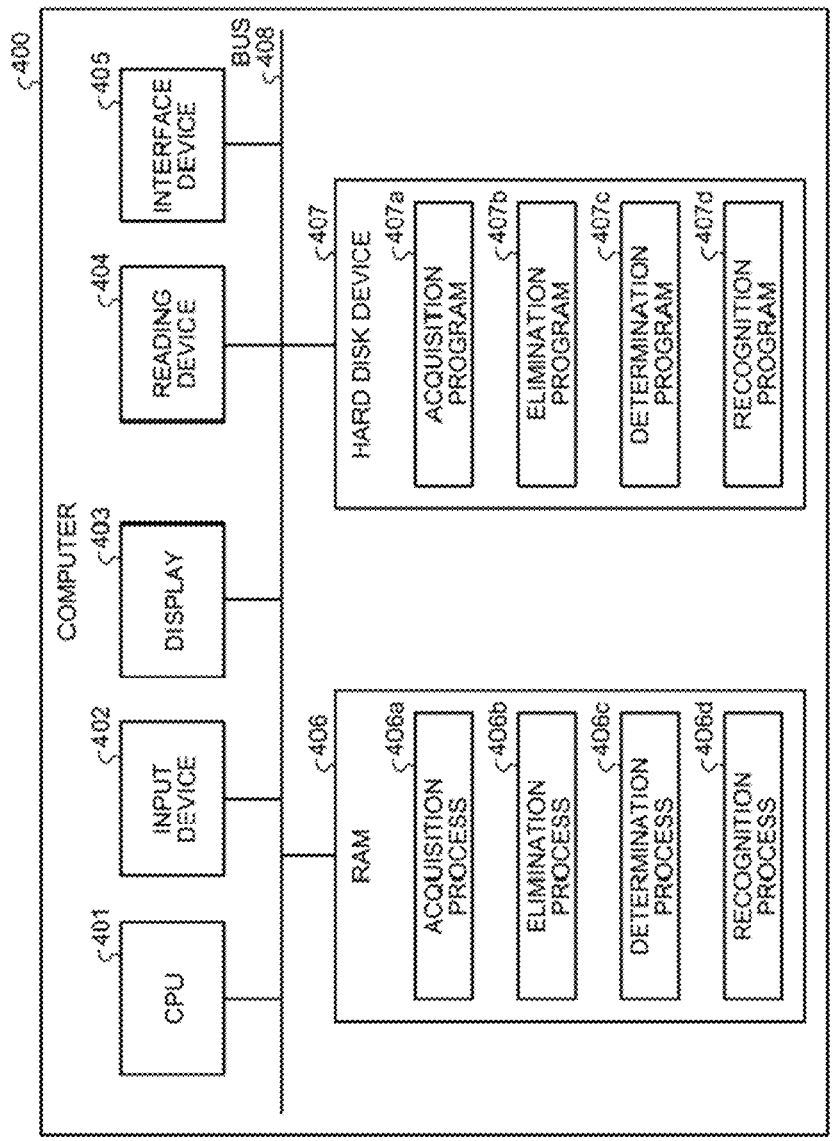
FIG. 14 is a diagram illustrating an example of a hardware configuration of a computer that realizes functions identical to those of the recognition device.

FIG. 14 is a diagram illustrating an example of a hardware configuration of a computer that realizes functions identical to those of the recognition device.

As illustrated in FIG. 14, a computer 400 includes a CPU 401 that performs various types of calculation processes, an input device 402 that receives input of data from a user, and a display 403. The computer 400 also includes a reading device 404 that reads programs and the like from a storage medium and an interface device 405 that transmits and receives data between another computer (the motion capture device 10 or the like) via a wired or wireless network. The computer 400 also includes a RAM 406 that temporarily stores therein various types of information and a hard disk device 407. The respective devices 401 to 407 are connected to a bus 408.

The hard disk device 407 includes an acquisition program 407a, an elimination program 407b, a determination program 407c, and a recognition program 407d. The CPU 401 reads the acquisition program 407a, the elimination program 407b, the determination program 407c, and the recognition program 407d and loads these programs into the RAM 406.

The acquisition program 407a functions as an acquisition process 406a. The elimination program 407b functions as an elimination process 406b. The determination program 407c functions as a determination process 406c. The recognition program 407d functions as a recognition process 406d.

The processing of the acquisition process 406a corresponds to the processing of the acquisition unit 240a. The processing of the elimination process 406b corresponds to the processing of the elimination unit 240b. The processing of the determination process 406c corresponds to the processing of the determination unit 240c. The processing of the recognition process 406d corresponds to the processing of the recognition unit 240d.

The programs 407a to 407d do not always need to be stored in the hard disk device 407 initially. For example, the respective programs are stored in a "portable physical medium" such as a flexible disk (FD), a CD-ROM, a DVD disk, a magneto-optical disk, and an IC card that are inserted into the computer 400. It is possible to configure that the computer 400 subsequently reads the respective programs 407a to 407d to execute them.

The present invention can determine parts of a human body appropriately.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A distance image processing device comprising:
a memory; and
a processor coupled to the memory and configured to:
generate a plurality of learning images in which a distance image representing a distance from a reference position to each position of the human body or each position of an object and a part image identifying each part of a human body or a part of an object are associated with each other based on a synthetic model in which a three-dimensional model of the human body and a three-dimensional model of the object are synthesized with each other;
correct a value of a region corresponding to a part of the object among regions of the distance image and a value of a region corresponding to a predetermined part of the human body, based on a distance image and a part image of the plurality of learning images; and
learn an identifier in which characteristics of the distance image and a part of the human body or a part of the object are associated with each other, based on the plurality of learning images including a corrected distance image.

2. The distance image processing device according to claim 1, wherein the processor is further configured to generate a plurality of other learning images in which the distance image and each joint position of the human body are associated with each other based on the synthetic model and the learning uses the plurality of other learning images to learn a skeleton estimator.

3. The distance image processing device according to claim 2, wherein the processor is further configured to correct a value of a region corresponding to a part of hair of the human body among the regions of the distance image based on a distance image and a part image of the learning image.

4. The distance image processing device according to claim 3, wherein the processor is further configured to correct a value of a region corresponding to a part of the object and a value of a region corresponding to a part of hair of the human body to be a value same as a value corresponding to a background of the distance image, respectively.

5. The distance image processing device according to claim 4, wherein the processor is further configured to acquire a distance image including a subject, an object, and a background from a distance sensor, generate a subject distance image by deleting the background and the object from the distance image including the subject, the object, and the background, determine a relation between a position of the subject distance image and a part of the human body based on the subject distance image and the identifier and recognize, a posture of the subject based on a relation of respective parts of the human body included in the subject distance image based on a determination result of the determining.

6. The distance image processing device according to claim 5, wherein the processor is further configured to determine a joint position of the subject based on the subject distance image and the skeleton estimator.

7. A distance image processing system comprising:
a learning device and a recognition device, the learning device comprises:

a memory; and a processor coupled to the memory and configured to:

generate a plurality of learning images in which a distance image representing a distance from a reference position to each position of the human body or each position of an object and a part image identifying each part of a human body or a part of an object are associated with each other based on a synthetic model in which a three-dimensional model of the human body and a three-dimensional model of the object are synthesized with each other;

correct a value of a region corresponding to a part of the object among regions of the distance image and a value of a region corresponding to a predetermined part of the human body, based on a distance image and a part image of the plurality of learning images; and learn an identifier in which characteristics of the distance image and a part of the human body or a part of the object are associated with each other, based on the plurality of learning images including a corrected distance image, and the recognition device comprises a memory; and a processor coupled to the memory and configured to:

acquire a distance image including a subject, an object, and a background from a distance sensor;

generate a subject distance image by deleting the background and the object from the distance image including the subject, the object, and the background;

determine a relation between a position of the subject distance image and a part of the human body based on the subject distance image and the identifier; and recognize, based on a determination result of the determination unit, a posture of the subject based on a relation of respective parts of the human body included in the subject distance image.

8. A distance image processing method comprising:

generating a plurality of learning images in which a distance image representing a distance from a reference position to each position of the human body or each position of an object and a part image identifying each part of a human body or a part of an object are associated with each other based on a synthetic model in which a three-dimensional model of the human body and a three-dimensional model of the object are synthesized with each other, using a processor;

correcting a value of a region corresponding to a part of the object among regions of the distance image and a value of a region corresponding to a predetermined part of the human body, based on a distance image and a part image of the plurality of learning images, using the processor; and learning an identifier in which characteristics of the distance image and a part of the human body or a part of the object are associated with each other, based on the plurality of learning images including a corrected distance image, using the processor.

9. The distance image processing method according to claim 8, wherein the generating generates a plurality of other learning images in which the distance image and each joint position of the human body are associated with each other based on the synthetic model and the learning uses the plurality of other learning images to learn a skeleton estimator.

10. The distance image processing method according to claim 9, wherein the correcting further corrects a value of a region corresponding to a part of hair of the human body among the regions of the distance image based on a distance image and a part image of the learning image.

11. The distance image processing method according to claim 10, wherein the correcting respectively corrects a value of a region corresponding to a part of the object and a value of a region corresponding to a part of hair of the human body to be a value same as a value corresponding to a background of the distance image.

12. The distance image processing method according to claim 11, further comprising: acquiring a distance image including a subject, an object, and a background from a distance sensor; generating a subject distance image by deleting the background and the object from the distance image including the subject, the object, and the background; determining a relation between a position of the subject distance image and a part of the human body based on the subject distance image and the identifier; and recognizing, a posture of the subject based on a relation of respective parts of the human body included in the subject distance image based on a determination result of the determining.

13. The distance image processing method according to claim 12, wherein the determining determines a joint position of the subject based on the subject distance image and the skeleton estimator.

14. A non-transitory computer readable recording medium having stored therein a recognition program that causes a computer to execute a process comprising:

generating a plurality of learning images in which a distance image representing a distance from a reference position to each position of the human body or each position of an object and a part image identifying each part of a human body or a part of an object are associated with each other based on a synthetic model in which a three-dimensional model of the human body and a three-dimensional model of the object are synthesized with each other;

correcting a value of a region corresponding to a part of the object among regions of the distance image and a value of a region corresponding to a predetermined part of the human body, based on a distance image and a part image of the plurality of learning images; and learning an identifier in which characteristics of the distance image and a part of the human body or a part of the object are associated with each other, based on the plurality of learning images including a corrected distance image.

15. The non-transitory computer readable recording medium according to claim 14, wherein the generating generates a plurality of other learning images in which the distance image and each joint position of the human body are associated with each other based on the synthetic model and the learning uses the plurality of other learning images to learn a skeleton estimator.

16. The non-transitory computer readable recording medium according to claim 15, wherein the correcting further corrects a value of a region corresponding to a part of hair of the human body among the regions of the distance image based on a distance image and a part image of the learning image.

17. The non-transitory computer readable recording medium according to claim 16, wherein the correcting respectively corrects a value of a region corresponding to a part of the object and a value of a region corresponding to a part of hair of the human body to be a value same as a value corresponding to a background of the distance image.

18. The non-transitory computer readable recording medium according to claim 17, the process further comprising: acquiring a distance image including a subject, an object, and a background from a distance sensor; generating a subject distance image by deleting the background and the object from the distance image including the subject, the object, and the background; determining a relation between a position of the subject distance image and a part of the human body based on the subject distance image and the identifier; and recognizing, a posture of the subject based on a relation of respective parts of the human body included in the subject distance image based on a determination result of the determining.

19. The non-transitory computer readable recording medium according to claim 18, wherein the determining determines a joint position of the subject based on the subject distance image and the skeleton estimator.

\* \* \* \* \*